United States Patent
Reeder et al.

(10) Patent No.: US 7,318,301 B2
(45) Date of Patent: *Jan. 15, 2008

(54) WINDOW, MUNTIN AND METHOD

(75) Inventors: Steven L. Reeder, Salisbury, NC (US); Michael A. Reeder, Salisbury, NC (US)

(73) Assignee: Custom Glass Products of Carolina, Inc., Salisbury, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/296,962

(22) Filed: Dec. 7, 2005

(65) Prior Publication Data

US 2006/0090410 A1    May 4, 2006

Related U.S. Application Data

(60) Continuation of application No. 90/006,818, filed on Oct. 20, 2003, now Pat. No. 6,415,579, which is a division of application No. 08/957,498, filed on Oct. 24, 1997, now Pat. No. 5,980,667.

(51) Int. Cl.
    *E06B 3/964* (2006.01)
(52) U.S. Cl. .................. 52/204.61; 52/656.8
(58) Field of Classification Search ............. 52/204.61, 52/660, 656.8, 786.13, 456, 730.3, 734.2, 52/204.593; 156/109; 428/34
    See application file for complete search history.

(56) References Cited

U.S. PATENT DOCUMENTS

| | | | |
|---|---|---|---|
| 3,308,593 A | 3/1967 | Smith | |
| 3,358,412 A | 12/1967 | Martin | 52/456 |
| 3,411,258 A | 11/1968 | Kessler | 52/456 |
| 3,716,164 A | 2/1973 | Fennema | |
| 3,946,531 A | 3/1976 | Armstrong | |
| 4,204,015 A | 5/1980 | Wardlaw | |
| 4,222,210 A | 9/1980 | Hanstein et al. | |
| 4,305,982 A | 12/1981 | Hirsch | |
| 4,348,435 A | 9/1982 | Mistrick et al. | |
| 4,358,490 A | 11/1982 | Nagai | |
| 4,430,836 A | 2/1984 | McKann | |
| 4,437,284 A | 3/1984 | Cribben et al. | |
| 4,475,311 A | 10/1984 | Gibson | 49/176 |
| 4,563,846 A | 1/1986 | Webb | |
| 4,686,121 A | 8/1987 | Rogalla | |

(Continued)

FOREIGN PATENT DOCUMENTS

CA    349611    4/1935

(Continued)

OTHER PUBLICATIONS

Bower, John, "Windows", Green Alternatives:, Nov./Dec. 1992, pp. 26-27.

(Continued)

*Primary Examiner*—Jeanette Chapman
*Assistant Examiner*—Jessica Laux
(74) *Attorney, Agent, or Firm*—Merchant & Gould PC

(57) ABSTRACT

A non-metal window muntin formed from plastic or wood is described for use in hermetically sealed insulated glass windows. The process for forming the muntin includes machining polystyrene sheets which are painted with a latex pain and baked prior to use between sealed glass of the window.

18 Claims, 3 Drawing Sheets

U.S. PATENT DOCUMENTS

| | | | |
|---|---|---|---|
| 4,783,938 | A | 11/1988 | Palmer |
| 4,791,010 | A | 12/1988 | Hanley et al. |
| 4,989,384 | A | 2/1991 | Kinghorn et al. |
| 5,048,252 | A | 9/1991 | Osborn .................. 52/456 |
| 5,088,307 | A | 2/1992 | Cole |
| 5,099,626 | A | 3/1992 | Seeger |
| 5,131,199 | A | 7/1992 | Clark |
| 5,274,976 | A * | 1/1994 | Burkhart .................. 52/456 |
| 5,315,797 | A | 5/1994 | Glover et al. ............. 52/171.3 |
| 5,345,743 | A * | 9/1994 | Baier .................. 52/455 |
| 5,410,841 | A | 5/1995 | Harris et al. |
| 5,440,847 | A | 8/1995 | Butler |
| 5,456,048 | A | 10/1995 | White |
| 5,465,539 | A | 11/1995 | Rose .................. 52/204.53 |
| 5,494,715 | A | 2/1996 | Glover |
| 5,555,989 | A | 9/1996 | Moran, Jr. |
| D374,485 | S | 10/1996 | Brown |
| 5,630,306 | A | 5/1997 | Wylie .................. 52/786.13 |
| 5,657,590 | A | 8/1997 | Digman et al. |
| 5,674,565 | A | 10/1997 | Kausch et al. ............. 427/258 |
| 5,899,033 | A | 5/1999 | Merchlewitz |
| 5,980,667 | A | 11/1999 | Reeder et al. |
| 6,035,597 | A | 3/2000 | Donaldson |
| 6,165,565 | A | 12/2000 | Schelhorn |
| 6,311,455 | B1 | 11/2001 | Gerard |
| 6,415,579 | B1 | 7/2002 | Reeder et al. |

FOREIGN PATENT DOCUMENTS

| | | |
|---|---|---|
| CA | 793040 | 8/1968 |

OTHER PUBLICATIONS

"Paint and Power Curing", Product Finishing Magazine, Aug. 1993, pp. 76-84.
Schrantz, Joe, "IR Ovens Go with the Gold", "Industrial Paint and Powder", Nov. 1993, pp. 25-26.
Triplett, Tim, "The Cure for the Common Coating", "Industrial Paint & Powder", Sep. 1995, pp. 18-20.
Bailey, Jane M., "Plastics Painting Makes a Splash at Polaris", "Industrial Paint & Powder", Jul. 1996, pp. 14-16.
Bailey, Jane M., "Waterborne Wows Wood Finishers", "Industrial Paint & Powder", Oct. 1996, pp. 18-21.
Bailey, Jane M., "Painting Plastics and Wheel Covers", "Industrial Paint & Powder", Nov. 1996, pp. 16-19.
Syote, Dieter, "Paints, Coatings and Solvents", 1993, pp. 213-215.
Reeder, et al., 5,980,667 response date Mar. 8, 1999 to Office Action dated Jan. 5, 1999.
Kent, Dr. Gary, "Prepaint Treatment of Plastics", Products Finishing Magazine, Aug. 1993, pp. 58-65.
Custom Glass' Complaint against Collins Custom Millworks et al. dated Jun. 17, 2003 (25 pages).
Answer and Counterclaim dated Jul. 23, 2003 (14 pages).
Answer to Counterclaim dated Aug. 14, 2003 (5 pages).
Defendants Collins Custom Mill Work, Inc. and Defendant Thomas L. Collins, Sr. Initial Disclosures dated Aug. 25, 2003 (8 pages).
Thomas L. Collins, Sr.'s Responses and Objections to Plaintiff's First Request for Production of Documents and Other Things dated Sep. 29, 2003 (18 pages).
Collins Custom Mill Works, Inc.'s Responses and Objection to Plaintiff's First Request for Production of Documents and Other Things dated Sep. 29, 2003 (25 pages).
Collins Custom Mill Works, Inc.'s Supplemental Response and Objections to Plaintiff's First Request for Production of Documents and Other Things to Collins Custom Mill Work, Inc. dated Oct. 10, 2003 (28 pages).
Thomas L. Collins, Sr.'s Supplemental Response and Objections to Plaintiff's First Request for Production of Documents and Other Things to Thomas L. Collins, Sr. dated Oct. 10, 2003 (23 pages).
Thomas L. Collins, Sr.'s Supplemental Response to Plaintiff's First Interrogatories to Defendant Thomas L. Collins, Sr. dated Oct. 10, 2003 (22 pages).
Defendant Collins Custom Mill Work, Inc.'s Supplemental Response to Plaintiff's First Interrogatories to Defendant Collins Custom Mill Works, Inc. dated Oct. 10, 2003 (22 pages).
Answer and Counterclaim to Amended Complaint dated Oct. 27, 2003 (20 pages).
Plaintiff's Responses and Objections to Defendants' First Interrogatories to Plaintiff Custom Glass Products of Carolina, Inc. dated Jan. 16, 2004 (18 pages).
Plaintiff's Responses and Objections to Defendants' First Request for Production of Documents and Things to Plaintiff Custom Glass Products of Carolina, Inc. dated Jan. 16, 2004 (24 pages).
Plaintiff's Responses and Objections to Defendants' Second Request for Production of Documents and Things to Plaintiff Custom Glass Products of Carolina, Inc. dated Jan. 16, 2004 (8 pages).
Plaintiff's Responses and Objections to Defendants' First Request for Admission to Plaintiff Custom Glass Products of Carolina, Inc. dated Jan. 16, 2004 (17 pages).
Defendant Thomas L. Collins, Sr.'s Response to Second Interrogatories to Defendant Thomas L. Collins, Sr. dated Jan. 16, 2004 (12 pages).
Defendant Collins Custom Mill Works, Inc.'s Response to Plaintiff's Second Interrogatories to Defendant Custom Mill Works, Inc. dated Jan. 16, 2004 (9 pages).
Defendant Thomas L. Collins' Response and Objections to Plaintiff's First Request for Admissions to Defendant Mr. Thomas L. Collins, Sr. dated Jan. 16, 2004 (15 pages).
Defendant Collins Custom Mill Works, Inc.'s Response and Objections to Plaintiff's First Request for Admissions to Defendant Colins Custom Mill Works, Inc. (12 pages).
Defendant Thomas L. Collins, Sr.'s Response and Objections to Plaintiff's Second Request for Production of Documents and Other Things to Defendant Thomas L. Collins, Sr. dated Jan. 16, 2004 (6 pages).
Defendant Collins Custom Mill Works, Inc.'s Response and Objections to Plaintiff's Third Request for Production of Documents and Other Things to Defendant Collins Custom Mill Works, Inc. dated Jan. 16, 2004 (6 pages).
Order Staying Action dated Feb. 9, 2004 (2 pages).
Deposition of Virginia R. Collins, vol. 1, taken on Oct. 21, 2003 (279 pages).
Deposition of Thomas L. Collins, Sr., vol. 1, Part 1, taken on Feb. 2, 2004 (60 pages).
Deposition of Thomas L. Collins, Sr., vol. 1, Part II, taken on Feb. 2, 2004 (292 pages).
Rule 30(b)(6) Deposition of Collins Custom Millworks (Thomas Loran Collins, Jr.) taken on Feb. 3, 2004 (324 pages).
Deposition of Thomas Loren Collins, Jr. taken on Feb. 11, 2004 (57 pages).
Deposition of Thomas Loren Collins, Jr. taken on Oct. 22, 2003 (276 pages).
Deposition of Carlos Deupree taken on Nov. 19, 2003 (98 pages).
Custom Glass' First Amended Complaint Against Collins Custom Millworks et al (30 pages).
Plaintiff's Initial Disclosures (5 pages).
Plaintiff's Amended Initial Disclosures (5 pages).
Infini-Lite's Declaratory Judgement Complaint Against Custom Glass dated Dec. 21, 2004 (7 pages).
Custom Glass' Answer and Counterclaim For Patent Infringement dated Jan. 25, 2005 (26 pages).
Defendants Disclosure Statement dated Jan. 25, 2005 (4 pages).
Inifini-Lite's Reply to Counterclaim dated Feb. 21, 2005 (13 pages).
Order Staying Action dated Apr. 11, 2005 (4 pages).
Plastics Finishing and Decoration, Copyright 1986, Van Nostrand Reinhold Company Inc ISBN: 0-442-28062-9, Chapter 8, pp. 130-145; Chapter 31, pp. 477-485.
Plastics: Surface and Finish, 2$^{nd}$ Edition, Copyright 1993, Royal Society of Chemistry, ISBN: 0-85186-209-8, Chapter 12, pp. 210-221.
Green Home Remodel, Health Homes for a Healthy Environment, King County Department of Natural Resources and Parks, Aug. 2005.

Order Granting Reexamination Dated Dec. 24, 2003 in application '818.

Office Action In Ed parte Reexamination Dated Feb. 18, 2005 in application '818.

Interview Summary in Ex Parte Reexamination in application '818.

Amendment Under 37 CFR §1.111 In Ex parte Reexamination Dated Apr. 18, 2005 in application '818, in response to Office Action In Ex Parte Reexamination Dated Feb. 18, 2005.

Response to the Defective Paper In Ex Parte Reexamination Dated Mar. 1, 2006 in application '818, in response to the Defective Paper In Ex Parte Reexamination Dated Jan. 31, 2006.

Amendment After Final under 37 CFR §1.530(d)-(i) In Ex Parte Reexamination Dated Oct. 11, 2006 in application '818, in response to the Final Office Action Dated Sep. 11, 2006.

Office Action In Ex Parte Reexamination Dated Nov. 30, 2006 in application '818.

Response Under 37 CFR §1.530(d)-(i) In Ex Parte Reexamination Dated Dec. 22, 2006 in application '818, in response to the Office Action In Ex Parte Reexamination dated Nov. 30, 2006.

Order Granting Request for Ex Parte Reexamination Dated Dec. 18, 2003 in application '802.

Office Action In Ex Parte Reexamination Dated Nov. 22, 2004 in application '802.

Amendment Under 37 CFR §1.111 Dated Jan. 24, 2005 in application '802, in response to Office Action In Ex Parte Reexamination Dated Nov. 22, 2004.

Office Action In Ex Parte Reexamination Dated Feb. 18, 2005 in application '802.

Amendment Under 37 CFR §1.111 Dated Jan. 24, 2005 in application '802, in response to Office Action In Ex Parte Reexamination Dated Nov. 22, 2004.

Notice of Defective Papers In Ex Parte Reexamination Dated May 20, 2005 in application '802.

Response to Notice of Defective Papers In Ex Parte Reexamination Dated Jan. 15, 2005, in response to Notice of Defective Papers In Ex Parte Reexamination Dated May 20, 2005.

Office Action In Ex Parte Reexamination dated Sep. 27, 2005 in application '802.

Interview Summary In Ex Parte Reexamination Dated Nov. 15, 2005 in application '802.

Amendment Under 37 CFR §1.116 Dated Nov. 28, 2005 in application '802, in response to Office Action In Ex Parte Reexamination Dated Sep. 27, 2005.

Ex Parte Reexamination Advisory Action Dated Dec. 13, 2005 in application '802.

Decision Dismissing Petition In Ex Parte Reexamination Dated Apr. 6, 2006 in application '802.

Decision Granting Petition For Continued Reexamination Dated Jul. 18, 2006 in application '802.

Preliminary Amendment In Ex Parte Reexamination Dated Dec. 22, 2006 in Application '802.

* cited by examiner

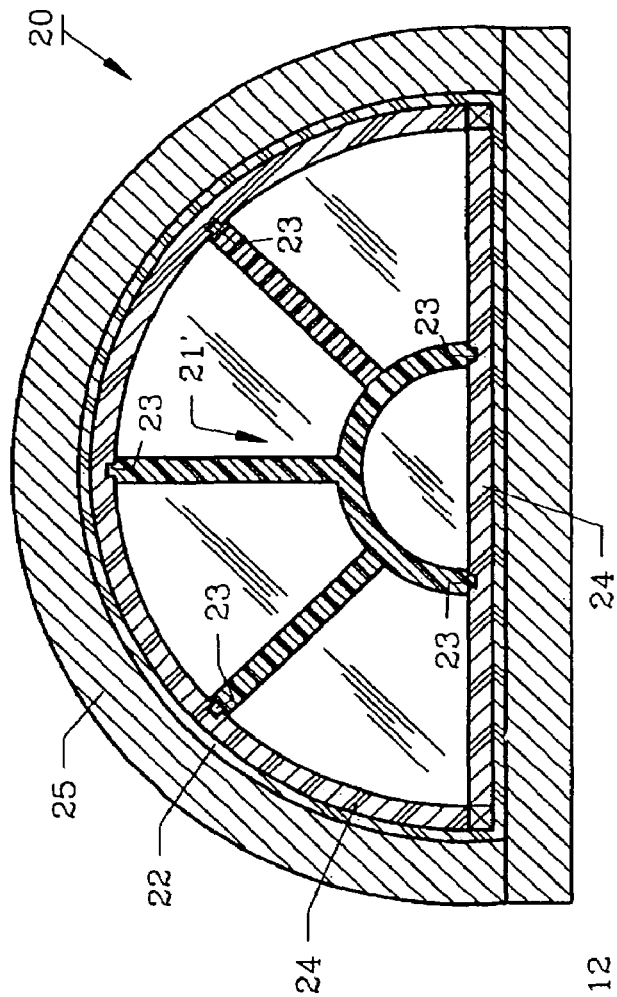
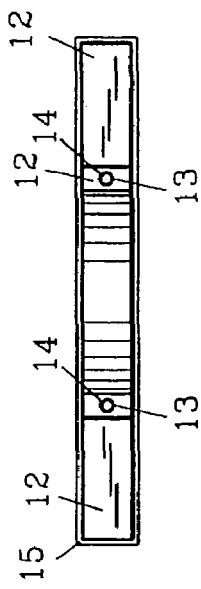
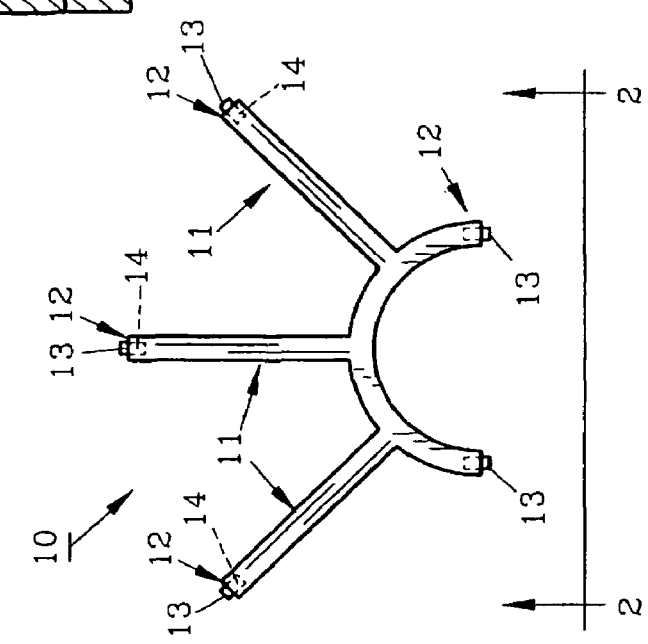
FIG. 4
FIG. 2
FIG. 1

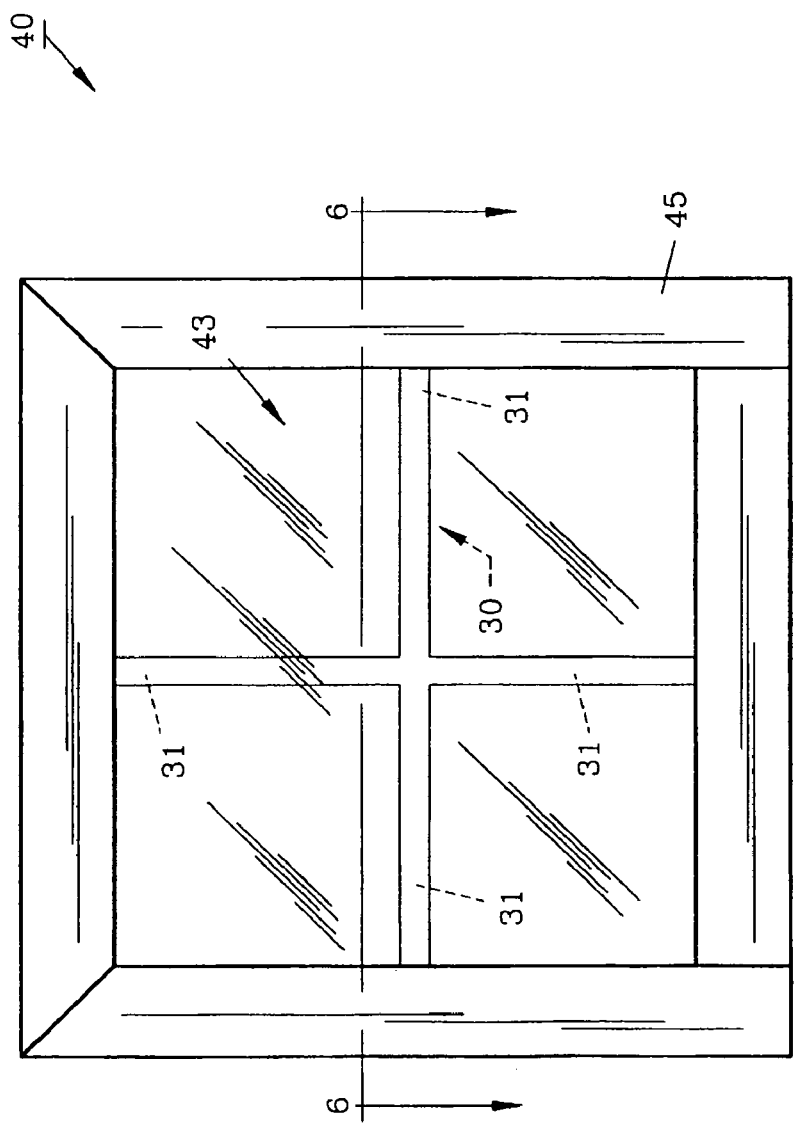
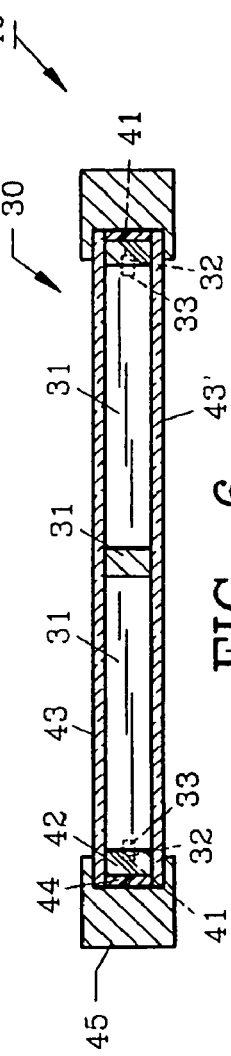
FIG. 5
FIG. 6

WINDOW, MUNTIN AND METHOD

CROSS REFERENCE TO RELATED APPLICATIONS

This is a continuation application of the co pending reexamination Ser. No. 90/006,818 filed on Oct. 20, 2003, which had issued as U.S. Pat. No. 6,415,579, from a divisional application of application Ser. No. 08/957,498 filed Oct. 24, 1997, entitled WINDOW, MUNTIN AND METHOD, now U.S. Pat. No. 5,980,667.

BACKGROUND OF THE INVENTION

1. Field of the Invention

This invention pertains to a decorative window muntin contained between two hermetically sealed panes of glass and a method for making the same.

2. Description of the Prior Art and Objectives of the Invention

In recent years, glass making and installing has progressed to allow large panes of window glass to be installed, whereas, previously, small panes were individually framed and supported within a window structure known by those in the industry as true divided lite (TDL). This TDL arrangement became unnecessary with utilization of large panes. For example, whereas, previously, a one meter by one meter window glass may have been made of nine individual panes of glass, now one pane is used.

While the science of glass and window making was advancing to allow larger panes of glass to be used, similar advances occurred in energy efficient windows, and hermetically sealed insulated glass windows have become increasingly popular. Such windows have parallel spaced panes of glass to provide insulation and increase energy conservation. These windows are commonly referred to as having insulated glass (IG) as two normal panes of glass are combined to form one pane of IG.

In an effort to make the appearance of the new IG windows match older windows, decorative muntins formed from metal are placed between the panes of glass in IG. These muntins do not provide any support; they are purely decorative. In this manner the IG windows look like TDL windows while providing the insulative properties desired by today's window owners and fabricators.

Problems sometimes arise in IG windows as strong sunlight or heated temperatures raise the temperature inside the sealed glass. Moisture in the muntin vaporizes and often recondenses on the inside surface of the glass pane, causing a fog-like effect which "clouds" the glass. Because the glass is sealed, cleaning or rubbing will not remove this clouding. The escape of moisture or liquid from the muntin is commonly referred to as "outgassing" and has been the cause of much dissatisfaction in the window fabrication and installation industry. Likewise, this problem has required the replacement of many IG windows which become opaque with moisture.

While outgassing is less of a problem with conventional aluminum muntins, another problem arises in the manufacture of aluminum muntins for use in IG windows. Aluminum can be difficult to bend using present technology, and some shapes are just not possible to create using aluminum. This is important in oddly shaped windows. Where aluminum can be used, it is frequently a multipiece assembly which raises manufacturing and assembly costs.

Other problems arise in the expansion and contraction of conventional muntins as they undergo temperature changes in installed windows. Some muntins expand too rapidly when heated and buckle within the IG. At other times when the expanded muntin attempts to contract, the warp or buckle has become permanent and is unsightly.

Therefore with these and other problems known, it is an objective of the present invention to provide a muntin for use in an IG window which does not cause or allow outgassing.

It is a further objective of the present invention to provide a muntin within an IG window which is pleasing to the consumer's eye.

It is still a further objective of the present invention to provide a muntin which is easy to manufacture through the use of Computer Aided Design (CAD) tools.

It is another objective to provide a muntin with low expansion characteristics and which has high memory.

It is yet another objective to provide an abrasive resistant muntin which is inexpensive to manufacture.

It is still a further objective to provide a one piece muntin that is ready to be placed within a window without additional assembly steps.

It is yet a further objective to provide a method of making a muntin with the above described characteristics.

Various other objectives and advantages of the invention will become readily apparent to those skilled in the art upon further reference to the detailed description below.

SUMMARY OF THE INVENTION

The aforesaid and other objectives are realized by a window muntin machined from a non-metal material, preferably polystyrene, although polyurethane or wood may be acceptable, which is easily machined using CAD technology. The machined muntin is painted with a latex paint and baked until the moisture is removed and the paint has dried. The baked muntin is then placed between two panes of glass and hermetically sealed therein as is usual in the art. This glass unit is then available for mounting in a conventional window assembly.

BRIEF DESCRIPTION OF THE DRAWINGS

FIG. 1 shows a front elevational view of the preferred embodiment of the decorative muntin of the invention;

FIG. 2 illustrates a bottom plan view of the muntin along lines 2-2 of FIG. 1;

FIG. 4 features a cross-sectional view of the window of FIG. 3;

FIG. 5 depicts an alternate embodiment of a muntin in a pane of insulated glass mounted in a window; and FIG. 6 shows a cross-sectional view of the window of FIG. 5 along lines 6-6.

DETAILED DESCRIPTION OF THE PREFERRED EMBODIMENTS AND OPERATION OF THE INVENTION

Figure 3:
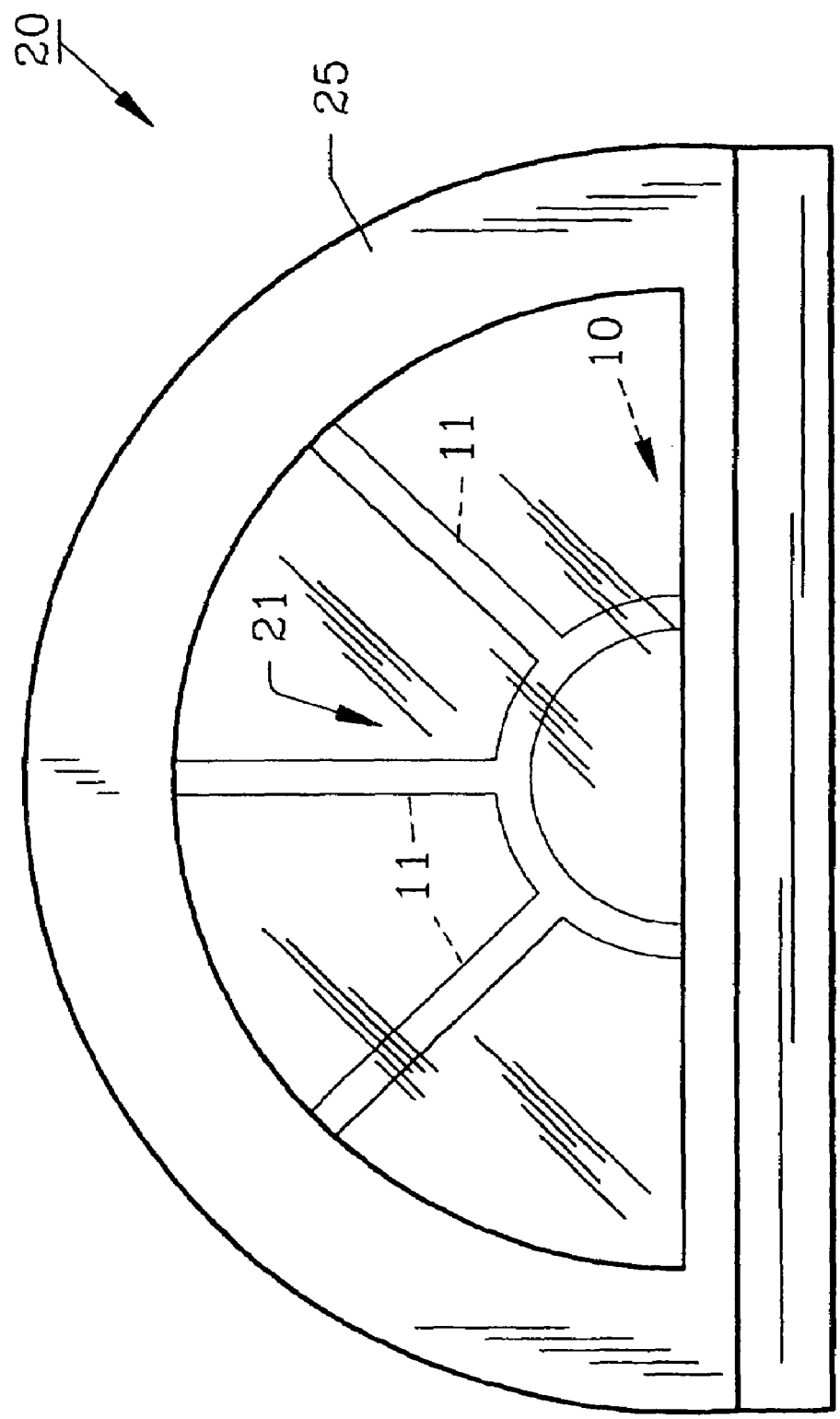
FIG. 3 demonstrates a front elevational view of the muntin of FIG. 1 mount between panes of glass in an IG window.

Turning now to the drawings, specifically FIGS. 1 and 2 show decorative window muntin 10, the preferred embodiment. Non-metal window muntin 10 is preferably machined from a 0.476 cm thick sheet of polystyrene, although other polymeric or non-metal materials such as polyurethane or wood may be acceptable, into a desired shape such as the radial display seen in FIG. 1, although other shapes and designs can be employed. Window muntin 10 includes a plurality of arms 11, each including end 12. Placed into each end 12 is cylindrical pin 13, which is preferably formed from aluminum 0.238 cm in diameter and 1.27 cm long. Pins 13 are received by cylindrical channels 14 which are preferably 0.238 cm in diameter and 0.635 cm deep, so that approximately one-half the length of each pin 13 extends from each channel 14. Pin 13 is centrally located on end 12 for optimum stability. Paint layer 15 (FIG. 2) completely surrounds and coats window muntin 10. Paint layer 15 is preferably conventional pigmented latex paint. It is within the scope of the present invention to use conventional clear or unpigmented sealants such as a polyurethane or other varnishes in place of paint 15.

After window muntin 10 is painted and heat cured as explained in the preferred method below, it is ready to be placed in insulated window 20 as seen in FIGS. 3 and 4. Insulated window 20 comprises two parallel, opposing conventional glass plies 21 and 21' disposed in conventional wooden or aluminum window frame 25. Glass plies 21 and 21' are spaced one from the other by conventional sealant 22, such as a two part polyurethane finish which hermetically seals plies 21 and 21' together. Spacer 24, formed from rolled aluminum preferably from 1.27 cm to 1.905 cm thick hold plies 21 and 21' apart and is placed inside, but flush against sealant 22, and includes a number of cylindrical channels 23 equal to the number of pins 13 on muntin 10 and spaced around spacer 24 according to the location of pins 13 on muntin 10. Channels 23 are, preferably, 0.238 cm in diameter and 0.635 cm deep to accommodate pins 13 as best seen in FIG. 4. As can be easily understood, pins 13 hold muntin 10 in the proper position when placed and secured in channels 23 and 14. Spacer 24 and muntin 10 are sandwiched between glass plies 21 and 21' as sealant 22 hermetically seals muntin 10 therein as is conventional and well understood in the art.

Window muntin 30, an alternate embodiment, is shown in FIGS. 5 and 6. Muntin 30 includes arms 31 with pins 32 much like muntin 10. Pins 32 fit into channels 33 of arms 31 and channels 41 of spacer 42. Glass plies 43 and 43' sandwich muntin 30 therebetween and are sealed with sealant 44. Frame 45 surrounds and obscures sealant 44 and spacer 42 from normal vision. Likewise, pins 32 are hidden from normal vision by muntin 30. It is to be understood, that while not shown, muntin 30 also has a layer of paint surrounding and sealing muntin 30 to prevent outgassing.

While only two embodiments of the present invention are shown, it is to be understood that any number of configurations or geometrically shaped windows, and muntins sized to fit such windows are possible and within the scope of the present invention. While glass is the preferred transparent ply, other plies such as polyacrylic, polycarbonates or the like may be used. The spacer would be resized and the channels in the spacer rod would be repositioned to accommodate the pins. Likewise, there is no particular muntin cross section preferred. A simple rectangle is shown in FIG. 2, but other conventional shapes are contemplated.

In the preferred method of making decorative window muntin 10, a cross section is chosen such as rectangular cross-section seen in FIG. 2. The dimensions of this cross-section are programmed into a conventional CAD program that can be downloaded into a three to five axis CNC router (not shown) such as those sold by CR Onsrud Inc. of Huntersvile, N.C. A planar sheet of high impact polystyrene, preferably 0.476 cm thick and of a size large enough to accommodate the desired pattern or configuration is placed on a cutting table (not shown) and secured. The cutting unit on the router is then engaged and the desired pattern is cut, so that an unfinished, but machined muntin 10 is created.

Using a conventional electric drill (not shown) with a 0.238 cm diameter drill bit, channels 23 are drilled 0.635 cm deep into the center of ends 12 of muntin 10. Pins 13 are inserted and secured in ends 12 with a conventional adhesive. Muntin 10 is cleaned using a conventional solvent such as an ethyl or other alcohol solution to remove any dust or oils from the cutting procedures. Muntin 10 is then coated with a conventional water-based latex paint such that layer of paint 15 is formed thereon. This is preferably done in a conventional spray booth. All sides of muntin 10 should be so coated with a light to medium coat of paint and allowed to completely air dry.

After drying, muntin 10 is then preferably heat cured or baked at 220° F. or 104.4° C. for twenty to thirty minutes so as to force the gases contained within muntin 10 to be driven out or be sealed therewithin. By this procedure, only an extremely low percentage of volatiles remains which can later cause outgassing. Muntin 10 is then placed between two plies of glass 21 and 21' as earlier described and is hermetically sealed or sandwiched between plies of glass 21 and 21' for use in a conventional window, such as window 20.

The preceding recitation is provided as an example of the preferred embodiment and an alternate embodiment for illustrative purposes and is not meant to limit the nature or scope of the present appended claims. Variations of the invention are anticipated by those skilled in the art.

What is claimed is:

1. A decorative window muntin made by a process comprising the steps of:
   providing a substantially rigid non-metal polymeric planar member;
   constructing the planar member into a unitary non-transparent one-piece muntin having no connecting joints and a curvilinear portion; and
   coating the constructed muntin on all sides with a heat cured coating, wherein said heat cured coating prevents the escape of remaining volatiles from said constructed muntin upon heating.

2. The muntin of claim 1, wherein the coating step comprises the step of coating the constructed muntin with a latex paint.

3. The muntin of claim 1, wherein the providing step comprises the step of providing a polystyrene member.

4. The muntin of claim 1, wherein the providing step comprises the step of providing a polyurethane member.

5. A window made by a process comprising the steps of:
   providing a first pane of glass;
   providing a second pane of glass;
   providing a unitary substantially rigid non-transparent one-piece muntin with no connecting joints, said muntin including at least three ends, said muntin comprising a heat cured coating layer on all sides;
   placing said muntin between said first pane of glass and said second pane of glass; and
   hermetically sealing the muntin between said first pane of glass and said second pane of glass.

6. The window of claim 5, further comprising the step of:
   coating the muntin with a latex paint prior to placing said muntin between said first pane of glass and said second pane of glass.

7. The window of claim 5, wherein the polymeric muntin comprises a polystyrene material.

8. The window of claim 5, wherein the polymeric muntin comprises a polyurethane material.

9. A muntin for use in a window, said muntin being made by a process comprising the steps of:
- providing a substantially rigid unitary non-transparent one-piece muntin with no connecting joints having at least three ends, said one-piece muntin adaptable to conform to the window; and
- covering the polymeric one-piece muntin with a heat cured coating on all sides, where said heat cured coating prevents the escape of remaining volatiles from said one-piece muntin upon heating.

10. The method of claim 9, wherein the covering step comprises the step of covering the polymeric one-piece muntin with a latex paint.

11. The method of claim 9, wherein the providing step comprises the step of providing a polystyrene one-piece muntin.

12. The method of claim 9, wherein the providing step comprises the step of providing a polyurethane one-piece muntin.

13. A window made by a process comprising the steps of:
- providing a first pane of glass and a second pane of glass;
- providing a substantially rigid unitary non-transparent one-piece muntin with no connecting joints, said muntin comprising a heat cured coating layer on all sides;
- placing said muntin adjacent to said first pane of glass and said second pane of glass.

14. The window of claim 13, wherein the process further comprises the step of:
- coating the muntin with a latex paint.

15. The window of claim 13, wherein the polymeric muntin comprises a polystyrene material.

16. The window of claim 13, wherein the polymeric muntin comprises a polyurethane material.

17. The window of claim 13, wherein the step of placing a muntin in a window further comprises the step of fixedly attaching said muntin to said first pane of glass.

18. The window of claim 13, wherein the step of placing a muntin in a window further comprises the step of fixedly attaching said muntin to said second pane of glass.

* * * * *